June 12, 1962 R. W. SPAFFORD 3,039,029
CONTROL APPARATUS FOR ELECTRICAL SYSTEMS
Original Filed Aug. 11, 1959 7 Sheets-Sheet 1

INVENTOR.
RALPH W. SPAFFORD
BY
Attorneys

Fig. 4-B

June 12, 1962 R. W. SPAFFORD 3,039,029
CONTROL APPARATUS FOR ELECTRICAL SYSTEMS
Original Filed Aug. 11, 1959 7 Sheets-Sheet 4

Fig. 5-A

INVENTOR.
RALPH W. SPAFFORD
BY

June 12, 1962 R. W. SPAFFORD 3,039,029
CONTROL APPARATUS FOR ELECTRICAL SYSTEMS
Original Filed Aug. 11, 1959 7 Sheets-Sheet 6

Fig:6

INVENTOR.
RALPH W. SPAFFORD
BY

June 12, 1962     R. W. SPAFFORD     3,039,029
CONTROL APPARATUS FOR ELECTRICAL SYSTEMS
Original Filed Aug. 11, 1959     7 Sheets-Sheet 7

INVENTOR.
RALPH W. SPAFFORD
BY

United States Patent Office 3,039,029
Patented June 12, 1962

3,039,029
CONTROL APPARATUS FOR ELECTRICAL SYSTEMS
Ralph W. Spafford, 13 Marquette Place, Park Forest, Ill., assignor of one-half to Bruce B. Krost
Continuation of application Ser. No. 832,933, Aug. 11, 1959. This application Oct. 14, 1960, Ser. No. 62,799
22 Claims. (Cl. 318—17)

The present application is a continuation of my application Serial No. 832,933 filed August 11, 1959, now abandoned.

This invention relates to control apparatus for electrical systems such as electric traveling crane systems.

One of the objects of the invention is to provide in an electric traveling crane system (comprising a motor-driven bridge traveling along a runway and provided with a power circuit, a collector-engaging control circuit for the bridge motor mounted along said bridge, and a motor-driven trolley traveling on the bridge) improved apparatus whereby the operator traveling along the trolley (either walking with the trolley or riding in a cab carried by the trolley) can control the bridge motor to control the bridge travel, such that the number of conductor bars and engaging collectors required in such collector-engaging control circuits for the bridge motor can be substantially reduced over prior control apparatus.

Another object of the invention is to provide such a circuit that motions of the bridge and trolley are controllable at the same time.

Another object is to provide for limiting the number of conductor bars and electrical collectors engaging the same to less than that previously required while maintaining a high degree of control.

Another object is the reduction in the cost of conductor bars, collectors, conductor bar brackets, collector mountings and other appurtenances in a traveling crane system by reducing the number of conductor bars and collectors over that formerly required for obtaining the desired control of the electrical motors in the system.

Another object is to reduce the maintenance costs of such a traveling crane system by reducing the number of conductor bars and collectors over that previously required for a standard of control of the electrical circuit in the system.

Another object is to obtain more positive operation of a traveling crane system through a reduction in loss of control of a crane system through side swaying of a traveling hoist and collectors and in loss of continuous engagement of the laterally outward collectors with the several outwardly spaced conductor bars of the prior systems incorporating a larger number of conductor bars and collectors.

Another object is provision of minimizing in the electric control of direction and speed of a traveling crane system the dependence upon a large number of conductor bars and electric collectors engaging the same, with all of the inherent disadvantages of such large number of bars and collectors.

Other objects and a fuller understanding of the invention may be had by referring to the following description and claims, taken in conjunction with the accompany drawings, in which:

Figure 1:
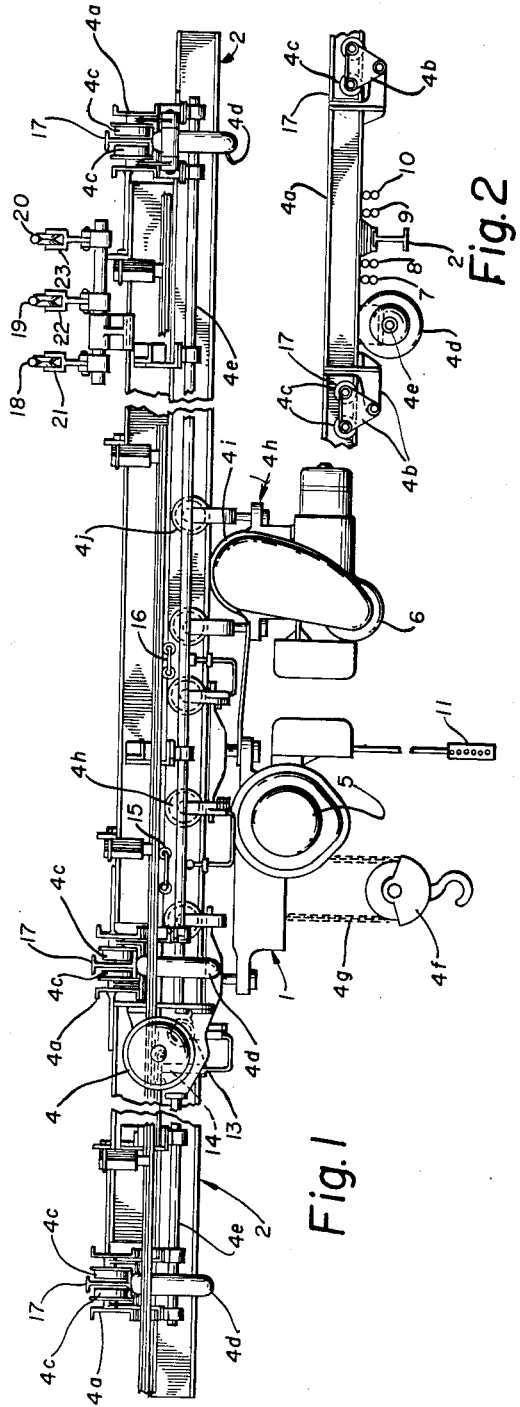
FIGURE 1 is a side elevation of a bridge and trolley utilizing my apparatus.
Figure 2:
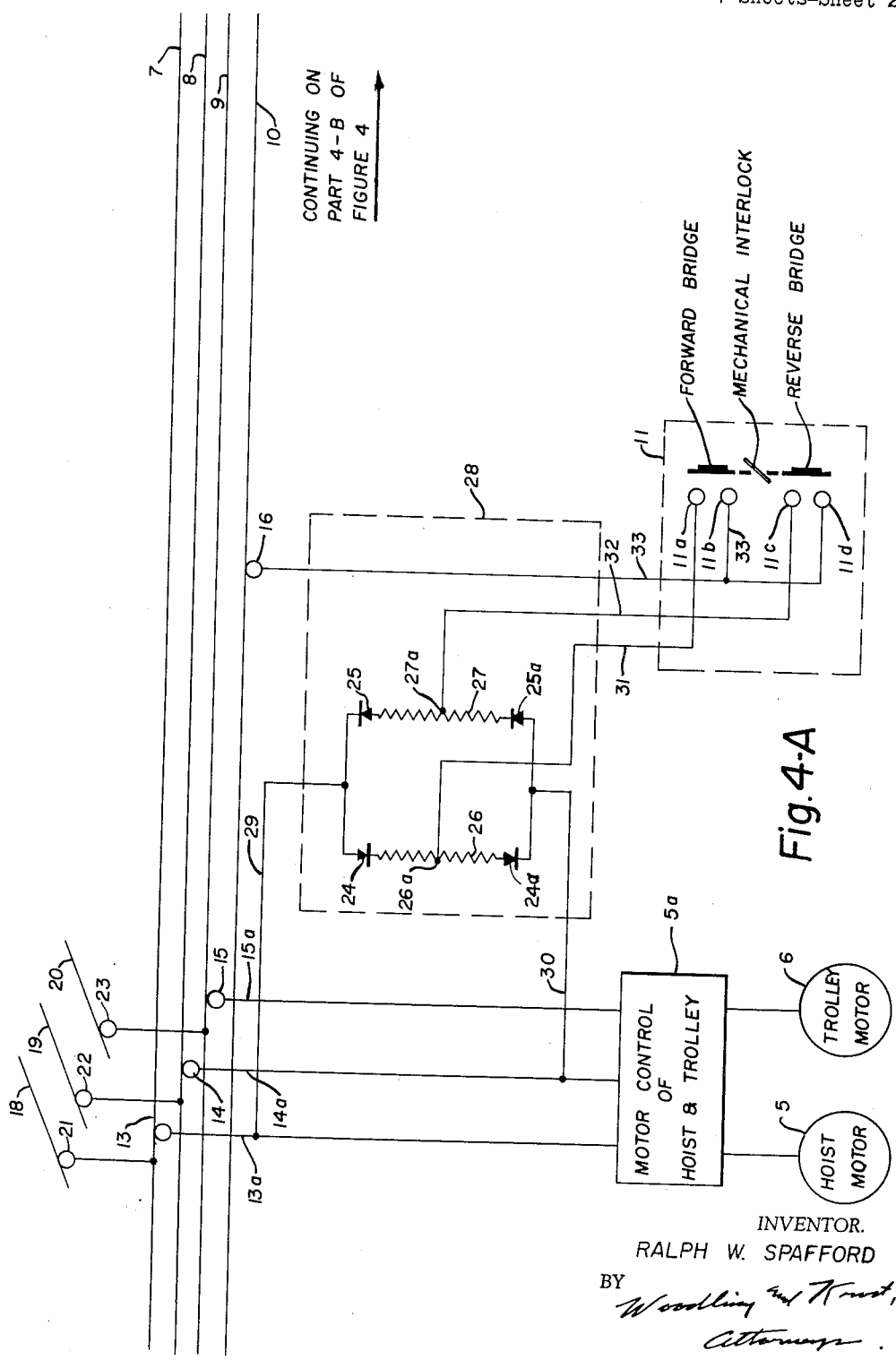
FIGURE 2 is an end elevation of the bridge end truck shown in FIGURE 1.
Figure 3:
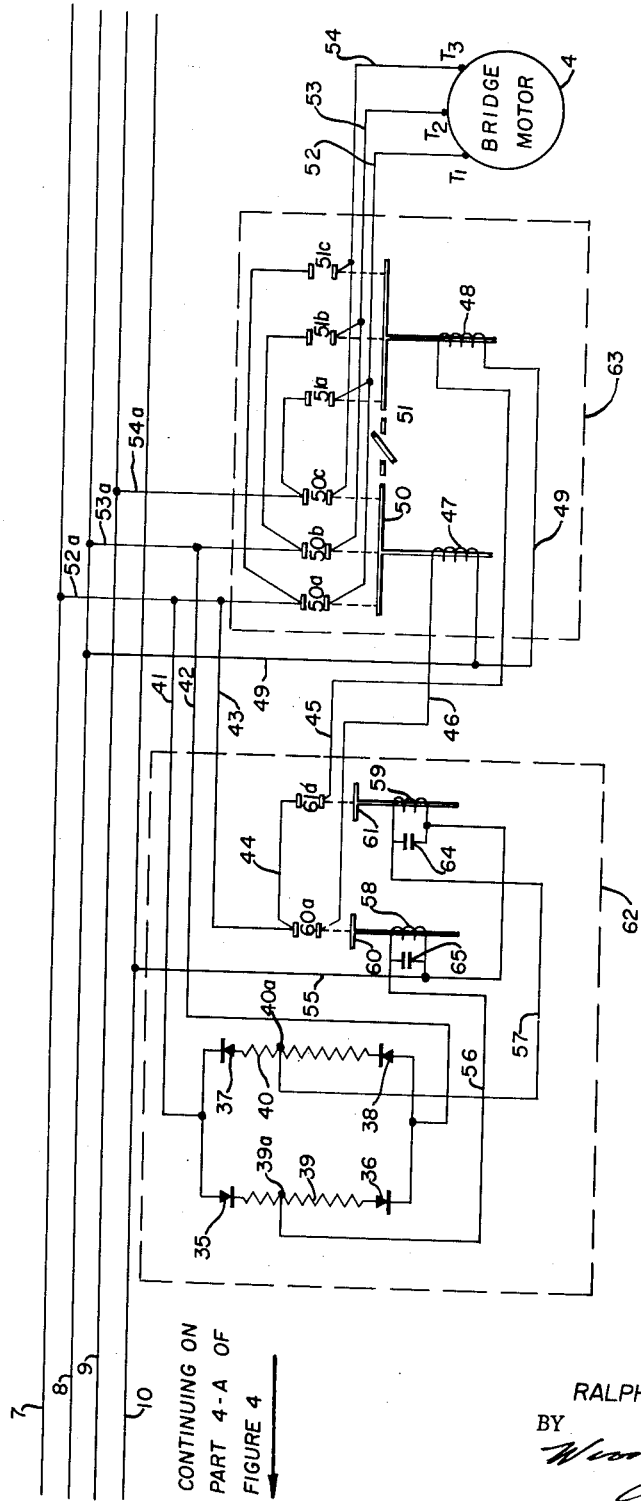
FIGURE 3 is a plan view of portions of the bridge and runways used in my apparatus.

As related in the statement of objects of the invention and indicated in FIGURES 1 through 3, the crane bridge 2 travels along crane runways 17. As shown in FIGURE 2, crane bridge 2 is carried by spaced parallel crane end truck channel members 4–a. End truck channel members 4–a are supported on runways 17 by means of end truck wheels 4–c journaled on adaptors or mounting brackets 4–b secured to the channel members 4–a.

Figure 4:
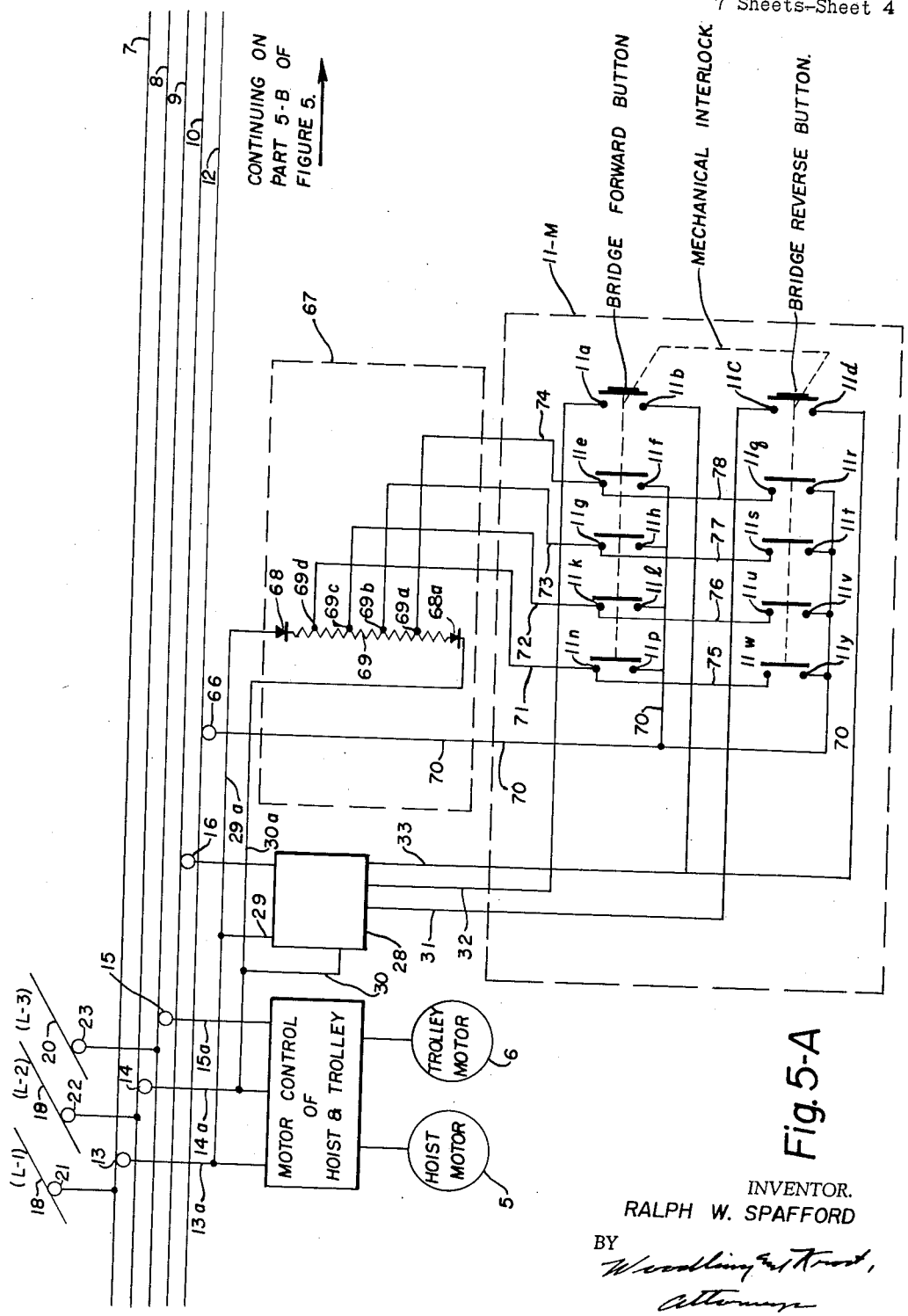
FIGURE 4 (comprised of parts 4A and 4B) is a wiring diagram of the direction-control circuit of my apparatus.
Figure 5:
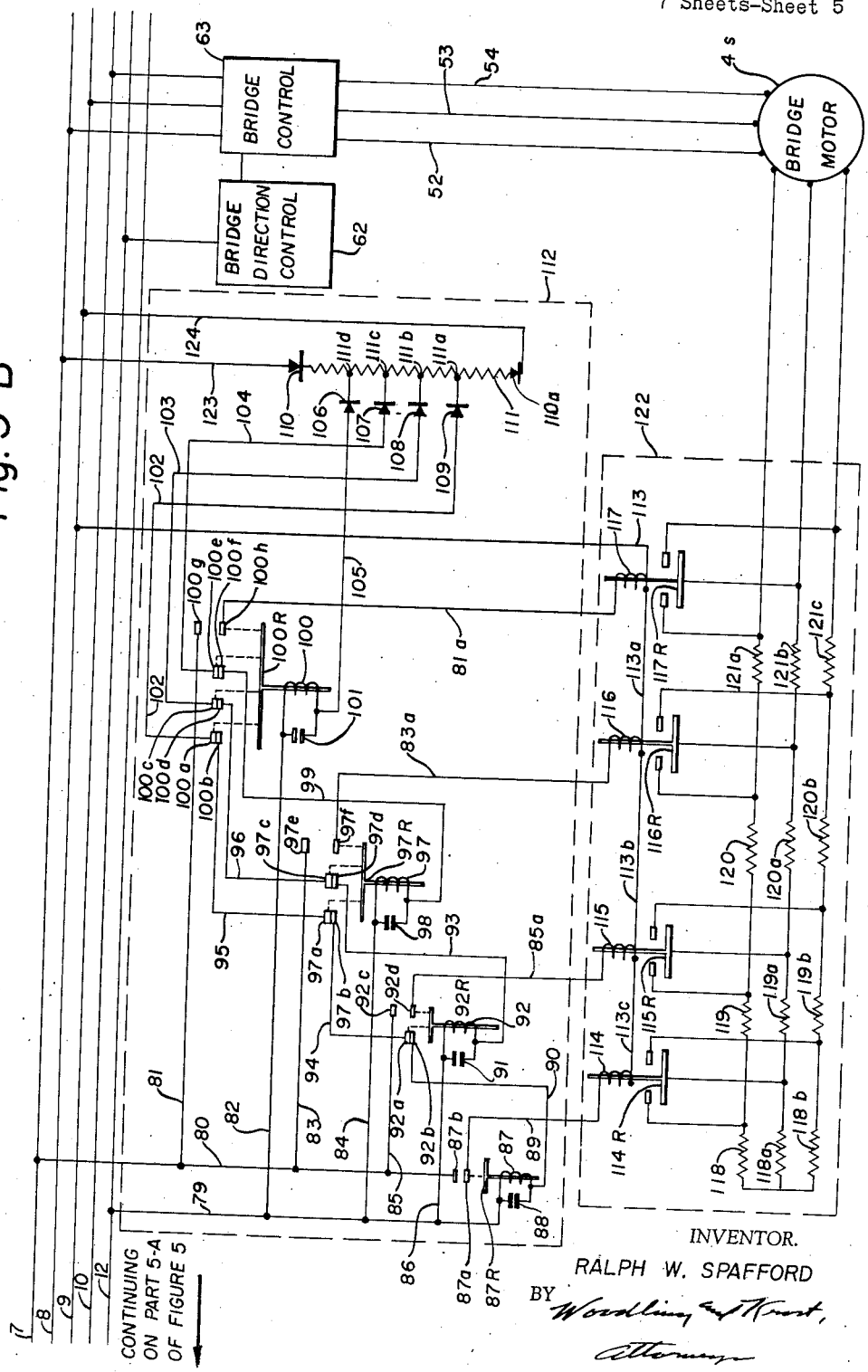
FIGURE 5 (comprised of parts 5A and 5B) is a wiring diagram of the speed-control circuit of my apparatus.

The crane bridge 2 is propelled along the crane runways 17 by traction wheels 4–d. Traction wheels 4–d are fastened to the crane end trucks 4–a and engage (by upward bias or pressure) with the underside of crane runways 17 (see FIGURE 2). The traction wheels 4–d are driven by a bridge motor 4 by means of crane drive shaft 4–e (see FIGURE 1). Bridge motor 4, as shown in FIGURE 4, is a polyphase squirrel cage motor as used in single-speed cranes. Bridge motor 4 is, as shown in FIGURE 5, a polyphase slip-ring motor as used in variable speed cranes.

Supported by and operating on the crane bridge is an electric hoist mechanism 1 propelled along the crane bridge by motor-driven trolley mechanism 4–h. As shown in FIGURE 1, a hoist-hook block 4–f is raised or lowered by means of hoist motor 5 through hoist chain 4–g.

Trolley motor 6 of the trolley mechanism 4–h drives traction wheel 4–i of the trolley mechanism 4–h. Traction wheel 4–i engages, under upward bias or pressure, the underside of crane bridge 2. Wheels 4–j support trolley mechanism 4–h on the crane bridge 2.

FIGURE 1 shows an arrangement wherein the operator of the apparatus walks along with the crane, hoist, and motor-driven trolley for the purpose of controlling their respective motions by means of a push-button mechanism 11. Since push-button mechanism 11 is mounted from the hoist trolley unit, it moves back and forth along the crane bridge 2 and permits remote control from any position along the crane bridge of the bridge motor 4, which together with its direction-control mechanism 63 (FIGURE 4) is carried by the crane bridge 2.

It should be noted in this illustration given by way of example that the bridge motor 4 had been shown remote from the push-button mechanism 11. However, the control circuits hereinafter described are valid and this invention is useful for any motor to be remotely controlled. To remotely control the bridge motor 4, there are utilized conductor bars and collectors for supplying electric current to the motor. In prior single-speed control circuits, at least three control conductor bars were required, one for forward crane travel, one for reverse crane travel and one for common return. In the control circuit utilizing the present invention, instead of such three conductor bars, only one control bar 10 and one control collector 16 (see FIGURES 3 and 4) replace the prior minimum of three conductor bars and three collectors engaging the same. If the remotely controlled motor is of the slip-ring type for providing a number of different speeds in prior control circuits, a different conductor bar is required for each speed change. In the conventional or prior five-speed variable control system, for example, four conductor bars are required to duplicate the function of a single conductor bar (bar 12) of the new control system hereinafter described.

FIGURE 4 (comprised of parts 4A and 4B joined together) is a wiring diagram showing how bridge motor 4 is controlled to operate in the forward or reverse direction to move the bridge 2 along the crane runways 17 by depressing the Forward bridge button of push-button mechanism 11 or by depressing the Reverse bridge button of push-button mechanism 11. Push-button mechanism 11 is carried by the hoist mechanism 1 on the trolley 4–h which moves along the bridge 2. The buttons of push-button mechanism 11 are mechanically interlocked to prevent operation of both buttons at once.

In FIGURE 4, the first power line 18, the second power line 19 and the third power line 20, disposed along and parallel to runways 17, are connected to a suitable source (not shown) of said electric power supply. Through electric collectors 21, 22 and 23 which engage lines 18, 19 and 20, respectively, as the bridge 2 moves along the runways 17, the electric power supply is delivered to respective lines 7, 8 and 9, extending along the bridge 2, which lines 7, 8 and 9 as shown are electrically connected, respectively, with the collectors 21, 22 and 23.

The bridge motor 4 is electrically connected at taps T–1, T–2 and T–3 of the motor windings through wires 52, 53 and 54, respectively, with the reversing starter mechanism 63, which in turn is connected as shown in FIGURE 4 with lines 7, 8 and 9 by wires 52–a, 53–a and 54–a, respectively. From FIGURE 4 it is seen that the closing of contacts 50–a, 50–b and 50–c of the power-relay mechanism 50 electrically connects runway lines 18, 19 and 20, through bridge lines 7, 8 and 9, respectively, with taps T–1, T–2 and T–3 of the bridge motor 4 to cause the bridge motor 4 to rotate in a first direction.

From FIGURE 4, it is also seen that the closing of contacts 51–a, 51–b and 51–c of power-relay mechanism 51 electrically connects runway lines 20, 19 and 18, through bridge lines 9, 8 and 7, respectively, with T–1, T–2 and T–3 to cause the bridge motor 4 to rotate in an opposite direction. Power-relay mechanism 50 and 51 are mechanically interlocked so as to operate alternatively between open and closed positions and not to be both closed at the same time. As indicated in FIGURE 4, the contacts 50–a, 50–b and 50–c of power-relay mechanism 50 close when solenoid coil 47 is electrically energized, as for example, by a 200-volt 60-cycle electric current supply. In like manner, solenoid coil 48 energized by electric current, as for example, a 200-volt 60-cycle supply operates the power-relay mechanism 51.

Solenoid coil 47 is energized with electric current by being connected through wire 49 to bridge line 8 (and then runway line 19) and to bridge line 7 (and then runway line 18) through wire 46, electric contact 60–a when closed, and wires 43 and 52–a as shown in FIGURE 4. Solenoid coil 48 is energized with electric current by being connected through wire 49 to bridge line 8 (and thence runway line 19) and to bridge line 7 (and then runway line 18) through wire 45, electric contact 61–a when closed, wire 44, wires 43 and 52–a as shown in FIGURE 4.

It is thus shown that closing contact 60–a of control relay 60 will cause bridge motor 4 to operate the bridge in the forward or first direction, and closing contact 61–a of control relay 61 will cause bridge motor 4 to operate the bridge in the reverse or opposite direction. As indicated in FIGURE 4, contact 60–a is closed by solenoid coil 58 of control relay 60, and contact 61–a is closed by solenoid coil 59 of control relay 61. Coils 58 and 59 are direct current solenoid coils of nominal voltage, as for example, 28 volts. The coils 58 and 59 and contacts 60–a and 61–a are included in control signal panel 62 which, with direction-control mechanism 63, is mounted on the bridge 2.

FIGURE 4 shows the control circuit by which coils 58 and 59 may be selectively energized although both are electrically connected to, and receive their respective control signals through, the same control conductor bar 10, resulting in the advantage of obtaining a substantial reduction in the number of control conductor bars required to be mounted on a crane bridge. The circuit for controlling coils 58 and 59 is as follows: In control signal panel 28, carried by and movable with the trolley 4–h, are mounted voltage dividers 26 and 27 suitable to the power supply through conductors 18 and 19. One of the voltage dividers 26 and 27 are jointly connected through wires 29 and 13–a, collector 13, line 7, and collector 21 to conductor 18. The opposite ends of dividers 26 and 27 are jointly connected through wires 30 and 14–a, collector 14, line 8, and collector 22 to conductor 19. In series with voltage divider 26 are diodes 24 and 24–a, so placed that an IR voltage drop appears across voltage divider 26 only during that part of the cycle that line 18 of the power supply is positive with respect to line 19. In series with voltage divider 27 are diodes 25 and 25–a so placed that an IR voltage drop appears across voltage divider 27 only during that part of the cycle that line 19 is positive with respect to line 18.

In control signal panel 62 are mounted voltage dividers 39 and 40 suitable to the power supply which are connected in parallel across conductor bar 7 (and hence line 18) through wires 52–a and 41 and across conductor bar 8 (and hence line 19) through wires 53–a and 42. In series with voltage divider 39 are diodes 35 and 36 so placed that an IR voltage drop appears across voltage divider 39 only when line 18 is positive with respect to line 19. In series with voltage divider 40 are diodes 37 and 38 so placed that an IR voltage drop appears across voltage divider 40 only when line 19 is positive with respect to line 18.

To energize coil 58 the Forward bridge button is depressed to electrically connect contact points 11–a and 11–b. An electrical connection is made from point 26–a on divider 26, through wire 31, through push-button contacts 11–a and 11–b, through wire 33, through trolley collector 16, through conductor bar 10, through wire 55, coil 58 of relay 60, wire 56 to connection 39–a on voltage divider 39. When line 18 is positive with respect to line 19, point 26–a of voltage divider 26 is more positive than point 39–a of voltage divider 39 to cause a voltage drop of 28 volts, for example, to appear at the terminals of coil 58. Capacitor 65 is a filter capacitor to smooth the pulsating direct current across coil 58 terminals. As described before, energizing of coil 58 causes the bridge to travel forward. It should be noted here that two conditions must be met to energize coil 58—the Forward bridge button must be depressed and line 18 must be positive with respect to line 19.

To energize coil 59 the Reverse bridge button is depressed to electrically connect contact points 11–c and 11–d. An electrical connection is made from point 27–a on divider 27, through wire 32, through push-button contacts 11–c and 11–d, through wire 33, through trolley collector 16, through conductor bar 10, through wire 55, through coil 59 of relay 61, through wire 57 to point 40–a on voltage divider 40. When line 19 is positive with respect to line 18, point 27–a of voltage divider 27 is more positive than point 40–a of voltage divider 40 to cause a voltage drop of 28 volts, for example, to appear at the terminals of coil 59. Capacitor 64 is a filter capacitor to smooth the pulsating direct current across coil 59 terminals. As described before, energizing of coil 59 causes the bridge to travel in the reverse direction.

It should also be noted that two conditions must be met to energize coil 59—the Reverse button must be depressed and line 19 must be positive with respect to line 18. It is also noted here that any suitable type of rectifier will operate equally well for the diodes 24, 25, 36, 37 and 38, these diodes being shown for purposes of illustration. Also other suitable types of amplifiers will operate equally well for relays 60 and 61, these relays being shown for purposes of illustration.

FIGURE 5 (comprised of parts 5A and 5B joined together) shows the circuit for bridge control of the variable speed type. For purposes of illustration, the bridge motor 4–s will be shown as a three-phase slip-ring motor.

The direction control of bridge motor 4–s will be similar to that described in connection with FIGURE 4. The speed control for bridge motor 4–s will be accomplished by a conventional secondary control panel 122. As the bridge motor 4–s initially operates (either forward or reverse), all the resistance banks are in the secondary circuit.

When coil 114 of power relay 114R is energized, resistance banks 118, 118–a and 118–b are shorted out causing the bridge motor 4–s to operate at a faster speed. In like manner, the speed of bridge motor 4–s is increased as power relays 115R, 116R and 117R are operated to short out their corresponding sets of resistance banks. The bridge motor 4–s reaches its high speed with the energizing of power relay 117R and shorts out all the resistance banks.

FIGURE 5 shows how relays 114R, 115R, 116R and 117R may be selectively energized although relays 114R, 115R, 116R and 117R are all electrically connected to and receive their control signals from the same control conductor bar 12, resulting, as mentioned in the opening statements, in the advantage of a substantial reduction in control conductor bars required to be mounted on a crane bridge. As indicated in FIGURE 5, relays 114R, 115R, 116R and 117R are operated by a 220-volt 60-cycle supply of current, for example. Specifically, relay 114R is energized when contacts 87–a and 87–b of control relay 87R are closed, electrically connecting line 18 through conductor bar 7, wire 80, contacts 87–b and 87–a, wire 89, coil 114, wires 113–c, 113–b, 113–a, 113 to line 19 through conductor bar 8. Relay 115R is energized when contacts 92–c and 92–d are closed, electrically connecting line 18 through conductor bar 7, wire 80, wire 85, contacts 92–c and 92–d, wire 85–a, coil 115, wires 113–b, 113–a and 113 to line 19 through conductor bar 8. Relay 116R is energized when contacts 97–a and 97–f, of relay 97R are closed, electrically connecting line 18 through conductor bar 7, wire 80, wire 83, contacts 97–e and 97–f, wire 83–a, coil 116, wires 113–a and 113 to line 19 through conductor bar 8. Relay 117R is energized when contacts 100–g and 100–h are closed, electrically connecting line 18 through conductor bar 7, wire 80, wire 81, contacts 100–g and 100–h, wire 81–a, coil 117 and wire 113 to line 19 through conductor bar 8.

To close contacts 87–a and 87–b of relay 87R, coil 87 of relay 87R must be energized. Coil 87 is a direct current coil of nominal voltage, say 28 volts, for example. Operation of relays 92R, 97R and 100R corresponds to the operation of relay 87R.

As shown in FIGURE 5, mounted on the hoist trolley unit and wired to push-button mechanism 11–m is signal control panel 67. Mounted in panel 67 is voltage divider 69, suitable to the power supply. In series with voltage divider 69 are diodes 68 and 68–a causing a pulsating direct current to flow in voltage divider 69 when line 18 is positive with respect to line 19, the circuit being line 18 through conductor bar 7, collector 13, wire 13–a, wire 29–a, diode 68, voltage divider 69, wire 30–a, wire 14–a, collector 14 to line 19 through conductor bar 8.

Mounted on the bridge 2 is signal control panel 112 carrying the parts and circuit shown. Mounted in panel 112 is voltage divider 111, suitable to the power supply. Connected in series with voltage divider 111 are diodes 110 and 110–a, causing a pulsating direct current voltage to flow in voltage divider 111 when line 18 is positive with respect to line 19. Carried by the hoist trolley unit is variable-speed push-button mechanism 11–m. Both the bridge Forward button and the bridge Reverse button carried by push-button mechanism 11–m may be depressed to different selective positions, causing different selective contacts to be operative. In FIGURE 5, depressing the bridge Forward button of push-button mechanism 11–m to the first selective point closes contacts 11–a and 11–b and causes the bridge motor 4 to operate as previously described in connection with FIGURE 4.

Depressing the Forward bridge button of mechanism 11–m in FIGURE 5 to the second selective point keeps contacts 11–a to 11–b closed and also closes contacts 11–e to 11–f.

Depressing the bridge Forward button of mechanism 11–m to the third selective point keeps contacts 11–a and 11–b closed, opens contacts 11–e and 11–f, and closes contacts 11–g and 11–h.

Depressing the bridge Forward button to the fourth selective point keeps contacts 11–a and 11–b closed, keeps contacts 11–e and 11–f open, opens contacts 11–g and 11–h and closes contacts 11–k and 11–l.

Depressing the bridge Forward button to the fifth selective point keeps contacts 11–a and 11–b closed, keeps 11–e and 11–f open, keeps 11–g and 11–h open, opens contacts 11–k and 11–l and closes contacts 11–a and 11–p.

Depressing the bridge Reverse button causes contacts 11–c and 11–d of mechanism 11–m to operate mechanically and electrically similar to the operation of contacts 11–a and 11–b in push-button mechanism 11 as previously described in connection with FIGURE 4. Contacts 11–q and 11–r, upon pressing the bridge Reverse button sufficiently, operate mechanically similar to the operation of contacts 11–e and 11–f and contacts 11–q and 11–r are connected together electrically as shown in FIGURE 5 by wires 78 and 70. In like manner, depressing the bridge Reverse button to its third, fourth and fifth selective points cause contacts 11–s and 11–t, 11–u and 11–v 11–w and 11–y, to operate mechanically (open and closing), and to operate electrically (because of wires 70, 77, 76 and 75) similar to the operation of contacts 11–g and 11–h, 11–k and 11–l, 11–n and 11–p, respectively.

As stated, to close contacts 87–a and 87–b of relay 87R, coil 87 must be energized. The circuit to energize coil 87 is a follows: Point 69–a of voltage divider 69 through wire 74 through contacts 11–e and 11–f (with the Forward bridge button depressed to its second selective point), wire 70, collector 66, control conductor 12, wire 79, coil 87, wire 90, normally closed contacts 92–a and 92–b, wire 94, normally closed contacts 97–a and 97–b, wire 95, normally closed contacts 100–a and 100–b, wire 102, diode 109 to point 111–a of voltage divider 111 (connected to line 8 through wire 124 and diode 110–a). Point 69–a of voltage divider 69 is more positive than point 111–a of voltage divider 111 so that a potential of 28 volts, for example, appears across the terminals of coil 87. Capacitor 88 is a filter capacitor to smooth out the pulsating direct current. While in this circuit, points 111–b, 111–c and 111–d are electrically connected to point 69–a and, being of a higher potential, no circuit through coils 92, 97 and 100 can be completed because of diodes 108, 107 and 106, respectively. As described before, to operate coil 115 of relay 115R for causing a speed change in bridge motor 4–s, contacts 92–c and 92–d of relay 92R must be closed by energizing coil 92. The circuit to energize coil 92 is as follows: Point 69–b on voltage divider 69, wire 73, contacts 11–g and 11–h (when button is at third selective speed, contacts 11–e and 11–f are now open), wire 70, collector 66, control conductor bar 12, wire 79, wire 86, coil 92, wire 93, normally closed contacts 97–c and 97–d, wire 96, normally closed contacts 100–c and 100–d, wire 103, diode 108, to point 111–b of voltage divider 111. Point 69–b of voltage divider 69 is more positive than point 111–b of voltage divider 111 so that a potential difference of 28 volts, for example, appears across the terminals of coil 92. Capacitor 91 is a filter capacitor to smooth the pulsating direct current to coil 92. While in this circuit points 111–c and 111–d of voltage divider 111 are potentially higher than point 69–b of voltage divider 69, and no circuit through coils 97 and 100 can be completed because of diodes 107 and 106. When coil 92 is energized, contacts 92–a and 92–b of relay 92R open and prevent coil 87 from becoming energized. (The normally closed contacts of relays 92R, 97R, 100R, open before the normally open contacts close.) To operate coil 116 of relay 116R (to give another speed to motor 4–s), contacts 97–a and 97–f of relay 97R must be closed by energizing coil 97. The circuit to energize coil 97 is as follows: Point 69–c on voltage divider 69, wire 72, contacts 11–k and 11–l (when button is at fourth selective speed, contacts 11–e and 11–f, 11–g and 11–h, are now open), wire 70, collector 66, control conductor bar 12, wire 79, wire 84, coil 97, normally closed contacts 100–e and 100–f, wire 104, diode 107, point 111–c on voltage divider 111. Point 69–c of voltage divider 69 is more positive than point 111–c of voltage divider 111 so that a potential difference of 28 volts, for example, appears across the terminals of coil 97. Capacitor 98 is a filter capacitor to smooth out the pulsating direct current across coil 97. While in the circuit, point 111–d of voltage divider 111 is higher potentially than point 69–c and no circuit through coil 100 can be complete because of diode 106. When coil 97 is energized normally closed contacts 97–a and 97–b, 97–c and 97–d open, preventing the energization of coils 87 and 92, respectively. To operate coil 117 of relay 117R (shorting out all secondary resistance in panel 122), contacts 100–g and 100–h of relay 100R must be closed by energizing coil 100. The circuit to energize coil 100 is as follows: Point 69–d of voltage divider 69, wire 71, contacts 11–n and 11–p of push-button mechanism 11–m, (when push-button is at fifth selective speed, contacts 11–e and 11–f, 11–g and and 11–h, 11–k and 11–l are now open), wire 70, collector 66, control conductor bar 12, wire 79, wire 82, coil 100, wire 105, diode 106, point 111–d of voltage divider 111. Point 69–d of voltage divider 69 is more positive than point 111–d of voltage divider 111 so that a potential drop of 28 volts, for example, appears across the terminals of coil 100. Capacitor 101 is a filter capacitor to smooth out the pulsating direct current across coil 100. When coil 100 is energized normally closed contacts 100–a and 100b, 100–c and 100–d, 100–e and 100–f, open to prevent coils 87, 92 and 97, respectively, from being energized. It should be noted that other suitable types of rectifiers will operate in this circuit as well as diodes 68, 100, 106, 107, 108 and 109. In like manner other suitable types of amplifiers may be substituted for relays 87R, 92R, 97R and 100R.

Figure 6:
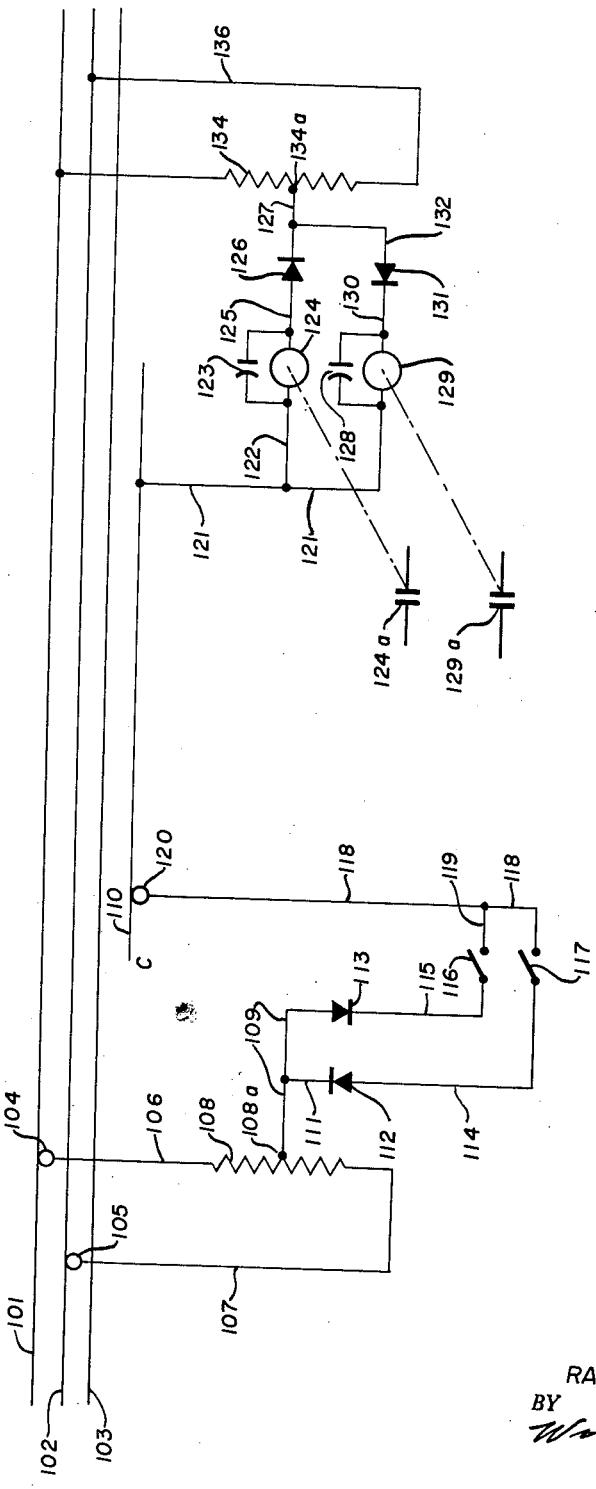
FIGURE 6 is an electrical circuit embodying a modified form of my invention.

FIGURE 6 shows a modified arrangement and illustrates the selective energization of coils 124 and 129 for closing contacts 124–a or 129–a, each connected to a different electrical circuit to be controlled. The contact points 124–a are shown diagrammatically by broken lines to be operated to open and closed positions by the energization or de-energization of coil 124. Likewise, contact points 129–a are shown diagrammatically by broken lines to be operated to open and closed position by the energization or de-energization of coil 129. This selective energization is done by means of a single bus bar or conductor 110 through the selective closing of switches 116 or 117, respectively.

Assuming the electric voltage of the alternating current across the voltage dividers 108 and 134 is 220 volts alternating in potential between bus bars or conductors 101 and 102, the driving motor of the illustrated system being three-phase, lines 101, 102 and 103 are shown. Tap point 108–a is at the midpoint of voltage divider 108. Tap point 134–a is not at the midpoint of voltage divider 134 but is nearer the lower end of divider 134 (that is, 134 but is nearer the connection with wire 136 and line 102), such that when line 101 is positive with respect to line 102, tap point 108–a is 12 volts more positive than tap point 134–a. However, when line 102 is positive with respect to line 101, then tap point 134–a is 12 volts more positive than tap point 108–a. Coils 124 and 129 operate on 12 volts. Capacitors 123 and 128 are filter capacitors. Coil 124 is energized by the closing of switch 116 (but not switch 117). The current path, with line 101 positive to line 102, is from tap point 108–a, wire 109, diode 113, wire 115, switch 116 (when closed), wire 119, wire 118, collector 120, control bar 110, wire 121, wire 122, coil 124, wire 125, diode 126, wire 127, to tap point 134–a. No current flows through coil 129 because of diode 131.

To energize coil 129, switch 117 (but not switch 116) is closed. The current path, when line 102 is more positive than line 101, is from tap point 134–a, through wire 132, diode 131, coil 129, wire 121, control bus bar 110, collector 120, wire 118, switch 117, wire 114, diode 112, wire 111, wire 109, to tap point 108–a. Coil 124 cannot be energized because of diode 126.

Figure 7:
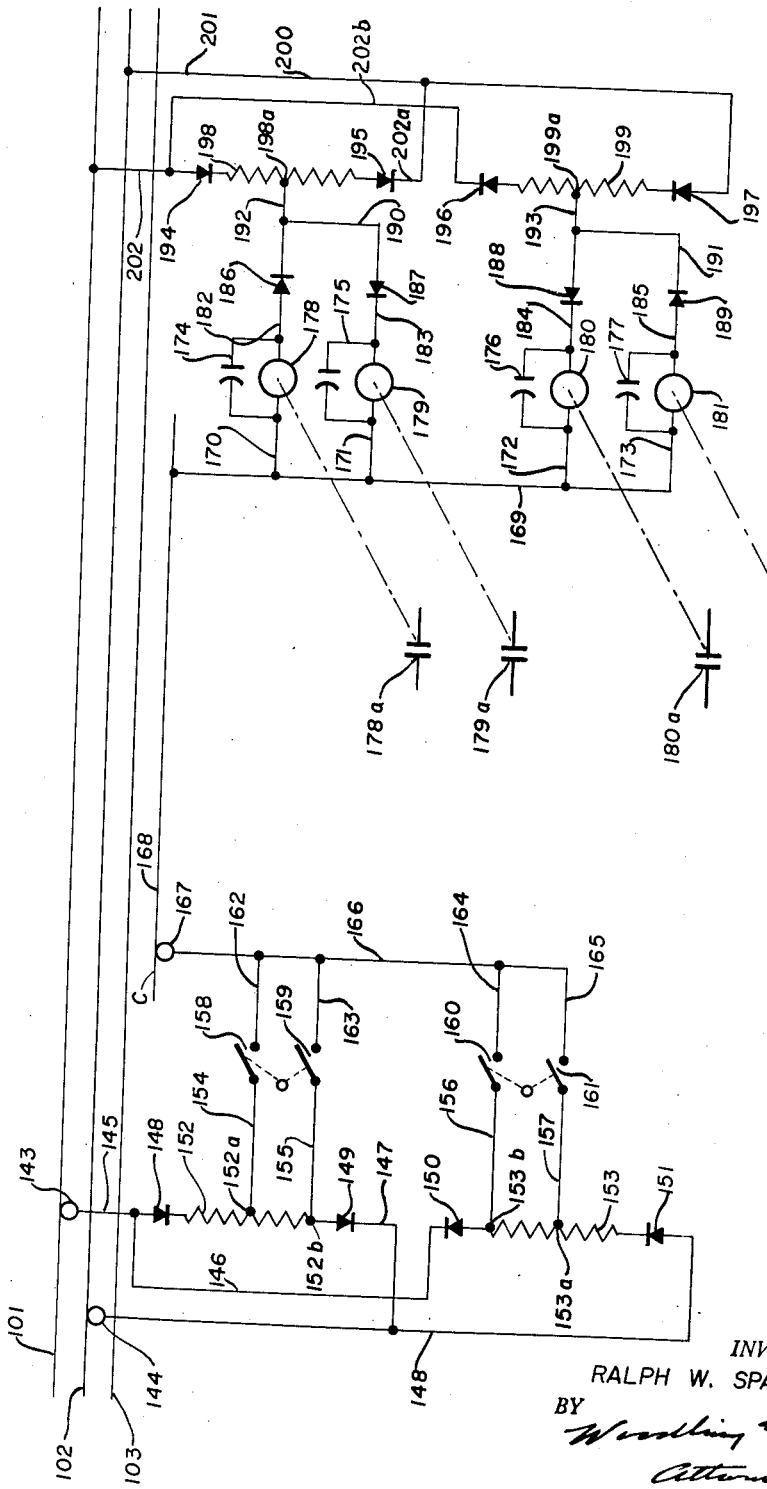
FIGURE 7 is an electrical circuit having another arrangement illustrating my invention.

FIGURE 7 shows another circuit arrangement whereby more than one coil can be energized selectively, over the same bus bar or conductor. In FIGURE 7, switch 158 and switch 159 are mechanically interlocked so that only one switch at a time is operative; likewise, switches 160 and 161 are mechanically interlocked for a like purpose.

Diodes 148 and 149 allow voltage divider 152 to be energized only when line 101 is positive with respect to line 142. Likewise, diodes 194 and 195 allow voltage divider 198 to be energized only when line 101 is positive with respect to line 102. Tap point 152–a is 12 volts more positive than tap point 198–a, and tap point 198–a is 12 volts higher than point 152–a. Coils 178 and 179 operate on 12 volts direct current. Capacitors 174 and 175 are filter capacitors. Coil 179 is operated by closing switch 158. Current flow is from tap point 152–a through wire 154, switch 158, wire 162, wire 166, collector 167, control bus bar or conductor 168, wire 169, wire 170, coil 178, wire 182, diode 186, wire 192 to tap point 198–a. Coil 179 cannot be energized because of diode 187.

Coil 179 is energized when switch 160 is closed. The current flow is from tap point 198–a, through wire 192, wire 190, diode 187, wire 183, coil 179, wire 171, wire 169, control bus bar or conductor 168, collector 167, wire 166, wire 163, switch 159, wire 155, tap point 152–b.

In the foregoing discussion it will be noted that current flow could take place through coil 178 or 179 only during the intervals that line 101 was more positive than line 102.

FIGURE 7 shows further circuitry than discussed which allows coils 180 and 181 to be energized during the intervals that line 102 is more positive than line 101. Diodes 150 and 151 allow voltage divider 153 to be energized only when line 102 is more positive than line 101. In like manner, diodes 196 and 197 allow voltage divider 199 to be energized only when line 102 is more positive than line 101. Tap point 153–a is 12 volts more positive than tap point 199–a. Tap point 199–a is 12 volts more positive than tap point 153–a. Coils 180 and 181 operate on 12 volts direct current.

To operate coil 181, switch 161 is closed. The current flow is from tap point 153–a, wire 157, switch 161 (when closed), wire 165, wire 166, collector 167, control bus bar or conductor 168, wire 169, wire 173, coil 181, wire 185, diode 189, wire 191, wire 193, to tap point 199–a. Coil 180 is not energized because of diode 188.

Coil 180 is energized by closing switch 160. The current flow is from tap point 199–a, through wire 193, diode 188, wire 184, coil 180, wire 172, wire 169, control bus bar 168, collector 167, wire 166, wire 164, switch 160, wire 156, to current tap point 153–a. Coil 181 is not energized because of diode 189.

As shown diagrammatically by broken lines, coil 178 operates electric contacts 178–a, coil 179 operates electric contacts 179–a, coil 180 operates electric contacts 180–a, and coil 181 operates electric contacts 181–a. The respective electric contacts are each electrically connected to a different electrical circuit providing a separate function or operation in the apparatus.

It is evident that the circuitry disclosed in FIGURE 7 would allow the remote control of two single-speed reversing motors over a single bus bar or conductor, and also the remote control of a multi-winding reversing motor over a single bus bar or conductor. It is also evident that a slip-ring motor can be remotely controlled over a single bus bar or conductor by arranging switches 160 and 161, coils 180 and 181, diodes 188 and 189, in a manner similar to that shown in FIGURE 5. More switches, coils and diodes can be added as more speeds are required.

In the description and claims, when the phases of pulsating direct current are referred to, it is meant to convey the thought that the pulsating direct current derived from the positive halves of the cycles of alternating current is of one phase, and the pulsating direct current derived from the negative halves of the cycles of alternating current is of an opposite phase. Thus, when diodes, in a circuit connecting conductors carrying alternating current, are pointed or directed in one direction relative to the conductors carrying flow of alternating current, there is produced pulsating direct current referred to as being of one phase. Conversely, when such diodes are pointed or directed in an opposite direction relative to the said conductors carrying the same flow of alternating current, there is produced pulsating direct current referred to as being of an opposite phase. When the alternating current is of one polarity, such as positive polarity, and is rectified by a diode to produce pulsating direct current during the upper or positive half of the cycle of the alternating current, the pulsating direct current resulting therefrom is here referred to as being of a first or positive phase. The pulsating direct current similarly produced during the opposite polarity of the alternating current is referred to as pulsating direct current of a second or opposite phase.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. Apparatus for controlling an operation of an electrically-driven device disposed along a pair of electrical conductors adapted to be connected to a source of alternating electric current for the driving of said device, comprising in combination, a first voltage divider electrically connected between said conductors, first diode means connected in series with said conductors and said first voltage divider to change alternating current impressed on the first voltage divider by said conductors to pulsating direct current, a first connection tapped to the first voltage divider to provide current at a first degree of voltage, a second voltage divider electrically connected between said conductors and in parallel with said first voltage divider, second diode means connected in series with said conductors and said second voltage divider to change alternating current impressed on the second voltage divider to pulsating direct current concurrent with the pulsating direct current of the first voltage divider, a second connection tapped to the second voltage divider to provide current of a second degree of voltage, said first and second degrees of voltage differing from each other for providing a voltage differential, an electric relay operable on said voltage differential and connected to control the said operation of said device, and connecting means electrically connecting said relay between said first and second connections for supplying said pulsating direct current of said differential voltage to said relay for energizing the same.

2. Apparatus for controlling an operation of an electrically-driven device disposed along a pair of electrical conductors adapted to be connected to a source of alternating electric current for the driving of said device, comprising in combination, a control conducting bar extending alongside of said electrical conductors between spaced positions, at least one of said positions being movable along said control conducting bar and of variable spacing from the other of said positions, a first voltage divider electrically connected between said conductors, first diode means connected in series with said conductors and said first voltage divider to change alternating current impressed on the first voltage divider by said conductors to pulsating direct current, a first connection tapped to the first voltage divider to provide current at a first degree of voltage, a second voltage divider electrically connected between said conductors and in parallel with said first voltage divider, second diode means connected in series with said conductors and said second voltage divider to change alternating current impressed on the second voltage divider to pulsating direct current concurrent with the pulsating direct current of the first voltage divider, a second connection tapped to the second voltage divider to provide current of a second degree of voltage, said first and second degrees of voltage differing from each other for providing a voltage differential, an electric relay operable on said voltage differential and connected to control said operation of said device, first and second connecting means electrically connecting said relay and said control conducting bar in series with said first and second connections for supplying said pulsating direct current through said control conducting bar to said relay to energize the same, at least one of said first and second connecting means including an electric collector movable along said control conducting bar for accommodating the electrical connection through said connecting means to variations in the spacing of said spaced positions, and a capacitor electrically connected to said relay to even out the pulsating direct current supplied to the relay by said connecting means.

3. In control apparatus for an electric motor of an electrically-driven device disposed along a pair of electrical conductors adapted to supply alternating electric current to said motor, a first circuit electrically connected across said conductors, a second circuit electrically connected across said conductors, one of said circuits being movable along said conductors relative to the other of said circuits, first rectifying means included in said first circuit for providing direct current in said first circuit, first voltage dividing means included in said first circuit for providing a first voltage value of said direct current, second rectifying means corresponding with said first rectifying means included in said second circuit for providing direct current concurrent with the direct current in said first circuit, second voltage dividing means included in said second circuit for providing a second voltage value of direct current different from said first voltage value, electric amplifying means connected to control circuits of said motor and operable on the differential voltage of said first and second voltage values and included in said second circuit in electrical connection with said second voltage dividing means and to be impressed with the direct current of said second voltage value in said second circuit, switch means included in said first circuit in electrical connection with said first voltage dividing means to be impressed with the direct current of said first voltage value in said first circuit, a control conducting bar extending along said pair of electrical conductors, first connecting means included in said first circuit for electrically connecting said switch means and said control conducting bar, and second connecting means included in said second circuit for electrically connecting said amplifying means and said control conducting bar, the connecting means included in said one of said circuits including an electric collector electrically engaging said control conducting bar for accommodating the movement of said one of said circuits along said conductors.

4. In control apparatus for the circuits of an electric motor having opposite drives connected for operating the motor in opposite driving directions, an electrically-driven device disposed along a pair of electrical conductors adapted to supply alternating electric current to said motor and along a control conducting bar disposed along said conductors, comprising in combination, a first circuit electrically connected across said conductors, a second circuit electrically connected across said conductors, one of said circuits being movable along said conductors relative to the other of said circuits, said first circuit including a pair of voltage dividers connected in parallel, rectifying means connected in series with each of said voltage dividers for converting said alternating current to pulsating direct current, the rectifying means of said pair of voltage dividers being oppositely disposed to alternate the pulsations of the pulsating direct current in each said voltage divider, a first switch electrically tapped to the said first voltage divider to provide current of predetermined voltage, a second switch tapped to the said second voltage divider to provide current of predetermined voltage, first connecting means electrically connecting said first and second switches to said control conducting bar whereby said voltage dividers may be selectively connected through said switches with said control conducting bar, said second circuit including a pair of voltage dividers connected in parallel, rectifying means connected in series with each of said voltage dividers in the second circuit for converting said alternating current to pulsating direct current, the rectifying means of said pair of voltage dividers in the second circuit being oppositely disposed to alternate the pulsations of the pulsating direct current in each of said voltage dividers, the rectifying means in the said circuits including means for assuring unidirectional flow of the current in the respective voltage dividers, first amplifying means electrically tapped to the first voltage divider of the second circuit to provide a current of predetermined voltage, second amplifying means electrically tapped to the second voltage divider of the second circuit to provide a current of predetermined voltage, each of said amplyifying means being connected in the respective circuits of said motor for independently controlling operation of each of said circuits, second connecting means electrically connecting said first and second amplifying means to said control conducting bar whereby said first and second amplifying means may be energized by current flowing through said control conducting bar, one of the first and second connecting means being movable along said control conducting bar to accommodate movement of said one of said circuits along said conductors, the predetermined voltage provided by the first voltage divider of the first circuit and the predetermined voltage provided by the first voltage divider of the second circuit being different to provide a differential voltage required for operation of said first amplifying means, the predetermined voltage provided by the second voltage divider of the first circuit and the predetermined voltage provided by the second voltage divider of the second circuit being different to provide a differential voltage required for operation of said second amplifying means, said first amplifying means being energizable upon closing of said first switch by the said differential voltage in said first voltage dividers of the first and second circuits and said second amplifying means being energizable upon closing of said second switch by said differential voltage in said second voltage dividers of said first and second circuits, the unidirectional flow of current in said voltage dividers preventing reverse currents to each of said amplyfying means upon energization of the other of said amplifying means.

5. Apparatus for obtaining control of a plurality of electrical circuits each controlling a different function in an electric motor-driven device disposed adjacent a pair of electrical conductors supplying alternating current for powering said electric motor-driven device from a location variably remote from said device and adjacent said pair of electrical conductors, comprising in combination, a pair of electric relays each connected to control a different circuit of said plurality of electrical circuits, a control conducing bar disposed alongside of said conductors for conducting control current to said relays, first means connected between said conductors and movable therealong in said variable locations for converting said alternating current to pulsating direct current and of a first predetermined voltage when a first of said conductors is positive with respect to a second of said conductors, second means connected between said conductors and movable therealong in said variable locations for converting said alternating current to pulsating direct current and of a second predetermined voltage when the second of said conductors is positive with respect to the first of said conductors, said first and second predetermined voltages each being less than the voltage of the alternating current carried by said conductors, third means including switch means for selectively connecting the first means to said control conducting bar for supplying the direct current of predetermined voltage from said first means to said control conducting bar, fourth means including switch means for selectively connecting the second means to said control conducting bar for supplying the direct current of predetermined voltage from said second means to said control conducting bar, said third means and fourth means being movable along said control conducting bar in said variable locations, fifth means connected between said conductors for converting said alternating current to pulsating direct current and of a third predetermined voltage when said first of said conductors is positive with respect to the second of said conductors, sixth means connected between said conductors for converting said alternating current to pulsating direct current of a fourth predetermined voltage when the second of said conductors is positive with respect to the first of said conductors, said direct current of first predetermined voltage being different in degree from and concurrent with said direct current of a third predetermined voltage to provide a first differential voltage, said direct current of a second predetermined voltage being different in degree from and concurrent with said direct current of a fourth predetermined voltage to provide a second differential voltage, seventh means electrically connecting a first of said electric relays with said control conducting bar and with said fifth means to deliver direct current of said first differential voltage to said first relay for energizing the same upon the closing of the switch means in said third means, and eighth means electrically connecting a second of said electric relays with said control conducting bar and said sixth means to deliver direct current of said second differential voltage to said second relay for energizing the same upon the closing of the switch means in said fourth means.

6. The combination of, first means for producing from an alternating current circuit a pulsating direct current of a first reduced predetermined voltage when one side of the alternating current circuit is positive with respect to the other side, second means for producing from said alternating current circuit a pulsating direct current of a second reduced predetermined voltage when the said other side of the alternating current circuit is positive in respect to said one side, a first switch mechanism electrically connected to the first means, a second switch mechanism electrically connected to the second means, a control conductor, first connecting means electrically connecting the first switch mechanism and second switch mechanism with said control conductor whereby the current produced by the first means and the current produced by the second means by alternate operation of the first and second switch mechanisms may be supplied to said control conductor, third means for producing from said alternating current circuit a pulsating direct current of a third reduced predetermined voltage when said one side of the alternating current circuit is positive with respect to the other side, said first and third predetermined voltages being different from each other and being simultaneous to produce a first direct current of a differential voltage, fourth means for producing from said alternating current circuit a pulsating direct current of a fourth reduced predetermined voltage when the said other side of the alternating current circuit is positive in respect to said one side, said second and fourth predetermined voltages being different from each other and being simultaneous to produce a second direct current of a differential voltage, a first electric amplifier connected for controlling an electric circuit, a second electric amplifier connected for controlling another electric circuit, second connecting means electrically connecting said control conductor with said first and second amplifiers, the said second connecting means, said first amplifier and said third means being connected in series whereby said first direct current of a differential voltage upon the closing of said first switch mechanism is supplied to the first amplifier to energize the same, the said second connecting means, said second amplifier and said fourth means being connected in series whereby said second direct current of a differential voltage upon the closing of the second switch mechanism is supplied to the second amplifier to energize the same.

7. The combination of first means for producing from alternating current energizing a pair of conductors leading to motor circuits of an electric motor-driven device a first source of pulsating direct current of predetermined voltage less than the voltage of said alternating current, second means for producing from said alternating current a second source of pulsating direct current of predetermined voltage less than the voltage of said alternating current, said first and second sources of pulsating direct current being alternate in timing, third means for producing from said alternating current a third source of pulsating direct current of predetermined voltage different in value from the predetermined voltage of said first source to produce a differential voltage of a phase the same as the phase of said first source, fourth means for producing from said laternating current a fourth source of pulsating direct current of predetermined voltage different in value from the predetermined voltage of said second source to produce a differential voltage and of a phase the same as the phase of said second source and opposite to the phase of said third source, a first electric relay electrically connected to said third means, a second electric relay electrically connected to said fourth means, said relays each being connected to a different one of said motor circuits for independently controlling the same, a first electric switch electrically connected to said first means for controlling the flow of said first source of pulsating direct current, a second electric switch electrically connected to said second means for controlling the flow of said second source of pulsating direct current, a control conducting bar, first connecting means electrically connecting said first and second switches to said control conducting bar, second connecting means electrically connecting said first and second relays to said control conducting bar, at least one of said connecting means being movable along and in electrical engagement with said control conducting bar, said first switch, upon being closed, said first connecting means, said control conducting bar, and said second connecting means electrically connecting said first relay in series between said first means and said third means to supply the differential voltage produced by said first and third sources to said first relay to energize the same, said second switch upon being closed, said first connecting means, said control conducting bar, and said second connecting means connecting said second relay in series between said second means and said fourth means to supply the differential voltage produced by said second and fourth sources to said second relay to energize the same.

8. The combination defined in claim 7, and including a first capacitor connected in parallel with said first relay and a second capacitor connected in parallel with said second relay.

9. In apparatus for independently controlling a plurality of electric motor circuits energized by alternating current delivered to said motor circuits by a pair of electric conductors extending substantially parallel to each other along a course, the combination of a control conducting bar extending along substantially parallel to said electric conductors, a first circuit connected across and movable along said pair of electric conductors to be impressed with said alternating current, said first circuit including voltage dividing means for producing current of a fixed reduced voltage and including diode means for producing a first pulsating direct current source of said fixed reduced voltage and of a first phase and for producing a second pulsating direct current source of said fixed reduced voltage and of a second and opposite phase, a first electric switch mechanism included in said first circuit electrically connected to and movable along said control conducting bar for selectively connecting said control conducting bar with said first current source, a second electric switch mechanism included in said first circuit electrically connected to and movable along said control conducting bar for selectively connecting said control conducting bar with said second source, a second circuit connected across said pair of electric conductors to be impressed with said alternating current, said second circuit including voltage dividing means for producing current of a fixed reduced voltage different from the fixed reduced voltage of said first circuit and including diode means for producing a first pulsating direct current source of said different fixed reduced voltage and of a first phase and for producing a second pulsating direct current source of said different fixed reduced voltage and of a second and opposite phase, the phase of the first current source of the second circuit corresponding to the phase of the first current source of the first circuit and the phase of the second current source of the second circuit corresponding to the phase of the second current source of the first circuit, a first electric amplifier connected to control a first of said electric motor circuits, and a second electric amplifier connected to control a second of said electric motor circuits, said first amplifier being included in said second circuit and being electrically connected to said control conducting bar to be impressed upon the closing of said first switch mechanism with the difference in the voltage of said first direct current sources of said first phase produced by the first and second circuits for energizing the first amplifier, said second amplifier being included in said second circuit and being electrically connected to said control conducting bar to be impressed upon the closing of said second switch mechanism with the difference in the voltage of said second direct current sources of said second phase produced by the first and second circuits for energizing the second amplifier.

10. The apparatus as defined in claim 9 in which there is a capacitor connected in parallel with each of said amplifiers.

11. The combination of first means for producing from alternating current carried by a pair of conductors a plurality of sources of pulsating direct current each of a different predetermined voltage, said first means including voltage dividing means and rectifying means, a control bar for conducting said sources to a remote location, a plurality of switches electrically connected to said first means and said control bar for impressing at one time a selected one only of said sources to said control bar, second means for producing from said alternating current a plurality of sources of pulsating direct current of a predetermined voltage intermediate of the predetermined voltages of said first sources, said second means including voltage dividing means and rectifying means, a plurality of relays electrically connected in parallel to said second means and to said control bar, the predetermined voltage of said second sources compared to the predetermined voltage of said first sources resulting in a plurality of differential voltages, said relays each being connected to an electrical circuit for controlling the same, a diode connected in series with each of said relays, said diodes being oppositely disposed to each other, the combination of said first and second means, relays, diodes, switches and control bar providing for the energization of one of said relays only by the closing of one of said switches only and the energization of the other of said relays only by the closing of the other of said switches only.

12. Apparatus for selectively controlling a plurality of electrical operating circuits each governing a different operation of a motor-driven device, comprising the combination of, a plurality of electric amplifiers each connected to control a different one of said operating circuits, first means for providing pulsating direct current having a voltage required for operating each amplifier and having different phases, second means for connecting to each said amplifier said pulsating direct current of one of said phases only, and third means for selectively impressing on said amplifiers only the direct current of said required voltage and of said one phase to energize the selected amplifier only.

13. Apparatus for controlling a plurality of electrical circuits of an electric motor-driven device, said circuits being energized by a plurality of conductors adapted to carry alternating electric current, comprising the combination of, a first voltage divider connected between a first and a second of said conductors, a second voltage divider connected between said first and second conductors, first diode means connected in said first voltage divider for producing in said first voltage divider pulsating direct current of a first phase when the first conductor is positive in respect to the said second conductor, second diode means connected in said second voltage divider for producing in said second voltage divider pulsating direct current of an opposite phase when the said second conductor is positive in respect to said first conductor, a first switch mechanism tapped to said first voltage divider to provide current of a first voltage, a second switch mechanism tapped to said first voltage divider to provide current of a second voltage, a third switch mechanism tapped to said second voltage divider to provide current of a third voltage, a fourth switch mechanism tapped to said second voltage divider to provide current of a fourth voltage, said second voltage being less than said first voltage and said third voltage being less than said fourth voltage, a control bar extending along said conductors, first connecting means electrically connecting said first, second, third and fourth switch mechanisms to said control bar for supplying current from said first and second voltage dividers to said bar upon the selective closing of one of said switch mechanisms, a third voltage divider connected between said first and second conductors, a fourth voltage divider connected between said first and second conductors, third diode means connected in said third voltage divider for producing in said third voltage divider pulsating direct current of one phase when the first conductor is positive with respect to said second conductor, fourth diode means connected in said fourth voltage divider for producing in said fourth voltage divider pulsating direct current of an opposite phase when the said second conductor is positive in respect to said first conductor, a first electric amplifier and a second electric amplifier connected in parallel with each other and both tapped jointly to said third voltage divider to provide current of a fifth voltage, a third electric amplifier and a fourth electric amplifier connected in parallel with each other and both tapped jointly to said fourth voltage divider to provide current of a sixth voltage, said first voltage being greater than said fifth voltage, said fifth voltage being greater than said second voltage, said fourth voltage being greater than said sixth voltage, and said sixth voltage being greater than said third voltage, second connecting means electrically connecting said first, second, third and fourth amplifiers to said control bar to supply to said amplifiers current from said first and second voltage dividers, and a diode connected in series with each of said amplifiers to pass thereto the pulsating direct current of one phase only, said diodes passing current of said one phase through said first and fourth amplifiers and passing current of said opposite phase through said second and third amplifiers, the said amplifiers being selectively energized only by current having a voltage differential and of a phase produced upon the selective closing of said switch mechanisms.

14. The combination defined in claim 13 and including capacitors each connected in parallel with each of said amplifiers.

15. The combination of first means for producing from a supply of alternating current a first plurality of sources of pulsating direct current of predetermined voltages less than the voltage of the said alternating current, some of said sources being produced into pulsating direct current of a first phase corresponding to one polarity of said supply of alternating current and other of said sources being produced into pulsating direct current of opposite phase corresponding with the opposite polarity of said supply of alternating current, the direct current sources of similar phases being of different predetermined voltages, a common control bar for conducting said direct current, selective means for selectively connecting said sources of predetermined voltage and of said first and opposite phases to said control bar, a plurality of amplifiers each connected to a different electrical circuit for independently controlling each said circuit, second means at a distance from said first means and along said control bar for producing from said supply of alternating current a second plurality of sources of pulsating direct current of predetermined voltage less than the voltage of said alternating current, at least one of said second sources being produced into pulsating direct current of a first phase corresponding to one polarity of said supply of alternating current and at least another of said sources being produced into pulsating direct current of opposite phase corresponding with the opposite polarity of said supply of alternating current, said predetermined values of said first and second sources having such values that a differential voltage results from connecting a source produced by the first means with a source of the same phase produced by the second means, rectifying means respectively connected in series with each of said amplifiers for selective energization of the respective amplifier in correspondence with the phase of the pulsating direct current supplied thereto through said selective means, said amplifiers being connected to said second means to be individually impressed with one of said sources of current produced by said second means, the said selective connection by said selective means connecting said sources of differential voltage and similar phases to energize one of said amplifiers.

16. Apparatus for controlling a plurality of electric motor circuits of a motor-driven device powered by a source of electric current carried by a pair of electric conductors, comprising the combination of, a first voltage divider electrically connected between said conductors, a plurality of switch mechanisms tapped to said first voltage divider at a series of positions, respectively, along said first voltage divider to provide a series of first current sources of successively lesser predetermined voltages, a control conducting bar, first connecting means electrically connecting said switch mechanisms to said control conducting bar for selectively supplying to said control conducting bar a selected one of said current sources, a second voltage divider electrically connected between said conductors at a distance from said first voltage divider, a plurality of electric amplifiers tapped to said second voltage divider at a series of positions, respectively, along said second voltage divider to provide a series of second current sources of successively lesser predetermined voltages, said amplifiers being arranged in a series each operable on a different voltage of progressively decreasing value in serial order corresponding with the said series of predetermined voltages, second connecting means electrically connecting said amplifiers to said control conducting bar to be connected thereby with the current source connected to the control conducting bar through said switch mechanism, a rectifier connected in series with each of said amplifiers, respectively, between said second voltage divider and said second connecting means, a plurality of normally closed electric contact mechanisms each connected in said second connecting means between said amplifiers and each controlled by energization of a preceding amplifier of said series of amplifiers operable on the next greater voltage value, the successive first and second sources produced by said first and second voltage dividers, respectively, alternating in voltage values to provide a voltage differential between a source of one voltage divider and a source of the other voltage divider in the same serial position of order in the respective series, said rectifiers being biased to prevent flow of current through an associated amplifier in but a single direction, said amplifiers being selectively energized by the differential voltage resulting from closing a selected switch mechanism, amplifiers in said series operable on lesser predetermined voltage being disconnected from said second connecting means by the opening of the normally closed contact mechanism operated by the respective amplifier, preceding amplifiers in said series operable on greater predetermined voltage being unoperable with reverse flow of current by the bias of the rectifier connected to the respective preceding amplifier.

17. Apparatus for controlling a plurality of electric motor circuits of a motor-driven device powered by a source of alternating current carried by a pair of electric conductors, comprising the combination of, a first voltage divider electrically connected between said conductors, first diode means electrically connected in said first voltage divider to produce pulsating direct current when a first of said conductors is positive with respect to a second of said conductors, a plurality of switch mechanisms tapped to the first voltage divider at a series of positions, respectively, along said first voltage divider to provide a series of first sources of said pulsating direct current having successively lesser predetermined voltages, a control conducting bar, first connecting means electrically connecting said switch mechanisms to said control conducting bar for selectively supplying to said control conducting bar a selected one of said current sources, a second voltage divider electrically connected between said conductors at a distance from said first voltage divider, second diode means electrically connected in said second voltage divider to produce pulsating direct current when said first conductor is positive with respect to said second conductors, a plurality of electric amplifiers tapped to the second voltage divider at a series of positions, respectively, along said second voltage divider to provide a series of second sources of said pulsating direct current having successively lesser predetermined voltages, said amplifiers being arranged in a series each operable on a different voltage of progressively decreasing value in serial order corresponding with the said series of predetermined voltages, second connecting means electrically connecting said amplifiers to said control conducting bar to be connected thereby with the current source connected to the control conducting bar through said switch mechanisms, a rectifier connected in series with each of said amplifiers, respectively, between said second voltage divider and said second connecting means, the successive first and second sources produced by said first and second voltage dividers, respectively, alternating in voltage values to provide a voltage differential between a source of one voltage divider and a source of the other voltage divider in the same serial position of order in the respective series, said rectifiers being biased to prevent flow of current through an associated amplifier in but a single direction, said amplifiers being selectively energized by the differential voltage resulting from closing a selected switch mechanism, preceding amplifiers in said series operable on greater predetermined voltage being unoperable by reverse flow of current by the bias of the associated rectifier connected to the respective preceding amplifier.

18. The combination of first means for producing from alternating current energizing a pair of conductors leading to a motor circuit of an electric motor-driven device a first source of pulsating direct current of predetermined voltage less than the voltage of said alternating current, second means for producing from said alternating current a second source of pulsating direct current of predetermined voltage different in value from the predetermined voltage of said first source to produce a differential voltage of a phase the same as the phase of said first source, an electric relay electrically connected to said second means, said relay being connected to said motor circuit for controlling the same, an electric switch electrically connected to said first means for controlling the flow of said first source of pulsating direct current, a control conducting bar, first connecting means electrically connecting said switch to said control conducting bar, second connecting means electrically connecting said relay to said control conducting bar, at least one of said connecting means being movable along and in electrical engagement with said control conducting bar, said switch, upon being closed, said first connecting means, said control conducting bar, and said second connecting means electrically connecting said relay in series between said first means and said second means to supply the differential voltage produced by said first and second sources to said relay to energize the same.

19. The combination of first means for producing from alternating current carried by a pair of conductors a plurality of first sources of pulsating direct current each of a different predetermined voltage, said first means including first voltage dividing means and first rectifying means, second means for producing from said alternating current a plurality of second sources of pulsating direct current each of a different predetermined voltage, said second means including second voltage dividing means and second rectifying means, said first and second rectifying means being of opposite bias to produce said pulsating direct current by said first means in one phase and by said second means in an opposite phase, a control bar for conducting said sources to a remote location, a plurality of switches electrically connected to said first means and second means and to said control bar for impressing at one time a selected one only of said sources of said pluralities of sources to said control bar, third means for producing from said alternating current a third source of pulsating direct current of a predetermined voltage intermediate of the predetermined voltages of said first sources, said third means including voltage dividing means and rectifying means, fourth means for producing from said alternating current a plurality of fourth sources of pulsating direct current of a predetermined voltage intermediate of the predetermined voltages of said third sources, said fourth means including fourth voltage dividing means and fourth rectifying means, said third and fourth rectifying means being of opposite bias to produce said pulsating direct current by said third means in said one phase and by said fourth means in said opposite phase, a pair of relays electrically connected in parallel to said third means and to said control bar and a pair of relays electrically connected in parallel to said fourth means and to said control bar, the predetermined voltage of said third source matched with the predetermined voltages of said first sources resulting in a plurality of differential voltages, the predetermined voltage of said fourth source matched with the predetermined voltages of said second sources resulting in a plurality of differential voltages, said relays being connected to an electrical circuit for controlling the same, the relays of each pair of relays being operable by a required differential voltage of the matched sources of the same phase impressed on the relays, a diode connected in series with each of said relays between said control bar and the respective third means and fourth means to bias the current flow through each said relay, said diodes connected to the relays of each pair of relays being oppositely biased to each other, the relays being selectively operated by the matching with said switches of the sources having a similar phase and having such predetermined voltages as to result in the voltage differential required for operating the selected relay.

20. Apparatus for controlling an operation of an electrically-driven device disposed along a pair of electrical conductors adapted to be connected to a source of alternating electric current for the driving of said device, comprising in combination, a control conducting bar extending alongside of said electrical conductors between spaced positions, at least one of said positions bieng movable along said control conducting bar and of variable spacing from the other of said positions, a first voltage divider electrically connected between said conductors, a first connection tapped to the first voltage divider to provide current at a first degree of voltage, a second connection deriving from said conductors a second degree of voltage, said first and second degrees of voltage differing from each other for providing a voltage differential, a direct current relay connected to control said operation of said device, first and second connecting means including rectifying means electrically connecting said relay and said control conducting bar in series with said first and second connections for supplying pulsating direct current through said control conducting bar to said relay to energize the same, at least one of said first and second connecting means including an electric collector movable along said control conducting bar for accommodating the electrical connection through said connecting means to variations in the spacing of said spaced positions.

21. In a control apparatus for an electric motor of an electrically-driven device disposed along a pair of electrical conductors adapted to supply alternating electric current to said motor, a first circuit electrically connected across said conductors, a second circuit electrically connected across said conductors, one of said circuits being movable along said conductors relative to the other of said circuits, first voltage dividing means included in said first circuit for providing a first potential of a control voltage, second means included in said second circuit for providing a second potential of a control voltage different from said first potential, electric amplifying means connected to control circuits of said motor and operable on the differential voltage of said first and second potentials and included in said second circuit in electrical connection with said second means, switch means included in said first circuit in electrical connection with said first voltage dividing means, a control conducting bar extending along said pair of electrical conductors, first connecting means included in said first circuit for electrically connecting said switch means and said control conducting bar, and second connecting means included in said second circuit for electrically connecting said amplifying means and said control conducting bar, the connecting means included in said one of said circuits including an electric collector electrically engaging said control conducting bar for accommodating the movement of said one of said circuits along said conductors.

22. The combination of first means for producing from alternating current energizing a pair of conductors leading to motor circuits of an electric motor-driven device a first source of current of predetermined voltage less than the voltage of said alternating current, second means for producing from said alternating current a second source of current of predetermined voltage less than the voltage of said alternating current, third means for producing from said alternating current a third predetermined voltage different in value from the predetermined voltage of said first source to produce a first differential voltage, fourth means for producing from said alternating current a fourth predetermined voltage different in value from the predetermined voltage of said second source to produce a second differential voltage, a first electric relay electrically connected to said third means, a second electric relay electrically connected to said fourth means, said relays each being connected to a different one of said motor circuits for independently controlling the same, a first electric switch electrically connected to said first means for controlling the flow of said first source of current, a second electric switch electrically connected to said second means for controlling the flow of said second source of current, a control conducting bar, first connecting means electrically connecting said first and second switches to said control conducting bar, second connecting means electrically connecting said first and second relays to said control conducting bar, at least one of said connecting means being movable along and in electrical engagement with said control conducting bar, said first switch, upon being closed, said first connecting means, said control conducting bar, and said second connecting means electrically connecting said first relay in series between said first means and said third means to supply the first differential voltage to said first relay to energize the same, said second switch upon being closed, said first connecting means, said control conducting bar and said second connecting means connecting said second relay in series between said second means and said fourth means to supply the second differential voltage to said second relay to energize the same, means to prevent said first differential voltage from energizing said second electric relay, and means to prevent said second differential voltage from energizing said first electric relay.

No references cited.